United States Patent [19]
Jaulmes

[11] 4,343,184
[45] Aug. 10, 1982

[54] DEVICE FOR DISPLAYING THE LEVEL OF FLUID CONTAINED IN A TANK

[75] Inventor: Christian Jaulmes, Paris, France

[73] Assignee: Atleliers de la Motobecane, Pantin, France

[21] Appl. No.: 149,532

[22] Filed: May 13, 1980

[30] Foreign Application Priority Data

May 23, 1979 [FR] France ................................. 79 13160

[51] Int. Cl.³ .......................................... G01F 23/16
[52] U.S. Cl. ..................................... 73/299; 73/323; 73/716
[58] Field of Search .......................... 73/299, 716, 323

[56] References Cited

U.S. PATENT DOCUMENTS 2,841,011 7/1958 Mayes .
3,545,276 12/1970 Parr ...................................... 73/716
3,713,338 1/1973 Kind .
4,048,855 9/1977 Setournet .

FOREIGN PATENT DOCUMENTS 641040 1/1928 France .................................. 73/299
2325908 4/1977 France .
598581 5/1978 Switzerland .

OTHER PUBLICATIONS

"Instrumentation", vol. 8 #, 1965 First Quarter, pp. 24–27, An Article Entitled, Measuring Liquid Level.

Primary Examiner—Kyle L. Howell
Assistant Examiner—Denis E. Corr
Attorney, Agent, or Firm—Browdy and Neimark

[57] ABSTRACT

A device for displaying the level of a fluid in a tank includes a housing, a membrane being positioned within the housing to separate the housing internally into a first portion and a second portion, which are fluid tight from one another. Fluid communication between the tank and the first portion of the housing is provided by conduit or the like. A pipe, at least a portion of which is transparent or translucent, is in fluid communication with the second part of the housing. A display liquid of given substantially fixed volume is held within the pipe. A spring within the second portion of the housing is in contact with the membrane on that side thereof which is in contact with the display liquid. A nut fixed to the housing has a screw extending through it into the second portion of the housing, the screw being in contact with the spring to adjustably compress it. Marks for determining the instant relative position of the screw with respect to the nut are provided on the nut. When the screw is positioned so that the level of display fluid in the tube is opposite a reference mark thereon, the mark on the nut adjacent a distinct part of the screw indicates the volume of fuel in the tank.

6 Claims, 6 Drawing Figures

DEVICE FOR DISPLAYING THE LEVEL OF FLUID CONTAINED IN A TANK

BACKGROUND OF THE INVENTION

This invention relates to a device for displaying the level of a fluid contained in a tank. The device is applicable more particularly to displaying the fuel level in the tank of a two-wheeled vehicle such as a motorcycle, MOPED, motorized bicycle and the like.

In regard to two-wheel vehicles provided with a fuel tank sometimes referred to as a shell tank, a fuel-level measuring device based on the principle of communicating vessels has already been proposed. This known device consists of a transparent tube, outside the tank, extending over the entire height of the tank and in fluid communication with the bottom of the tank.

Under these conditions, the display liquid is the same liquid which is contained in the tank. It is consequently volatile and flammable, which is dangerous particularly in case of a fall or other accident involving the vehicle. Moreover, in many jurisdictions such arrangements may be prohibited by law or regulations. Further, particularly on MOPEDS, the tank extends over a considerable height, going from the steering holders to the pedal or foot rest and it is necessary to have a long length of transparent tube to display the fuel level; whereas, it would be convenient to check the level over a smaller height. Furthermore, it would be desirable that the height extent be located at a level easily accessible and visible to the user.

It is also known how to provide a device for displaying the level of liquid in a tank in which the fluid in the tank is prevented from entering the transparent tube or the like.

The above-mentioned, known device comprises a fuel tank on the inside of which is provided a pipe. This pipe is extended to bring the fuel to the carburetor. On the pipe is a tap bringing the fuel to a housing in the central part of which is mounted on a membrane preventing the passage of the fuel from the tank into the display tube. On the other side of the membrane, coming out in housing, a pipe is provided containing a liquid of a specific weight greater than that of the fuel in the tank. The volume contained in the second pipe is determined and is invariable in time. In this particular known prior art device, the membrane is relatively stiff, requiring some considerable differential to move it. In other words, a considerable subtractive factor is present.

SUMMARY OF THE INVENTION

It is the principal object of the present invention to provide a device which avoids the above-mentioned drawbacks and yet effectively displays the level of fluid in a tank.

It is a salient characteristic of the present invention in a device which displays the level of fluid in a tank and includes a membrane between the fluid in the tank and a display tube, to provide a spring which acts on the membrane and tends to move it in the direction of the fluid in the tank, an adjusting screw being provided to adjust the position of the membrane between the two fluids and thus a reference level of the fluid in the measuring tube.

DETAILED DESCRIPTION OF THE PREFERRED EMBODIMENT

Figure 3:
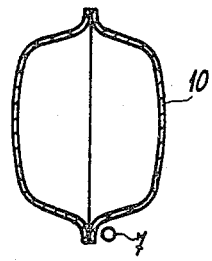
FIG. 3 is a cross sectional view of the tank and measuring tube visible in FIG. 2, the cross-section being taken in a plane perpendicular to the longitudinal axes of the tank and tube.
Figure 4:
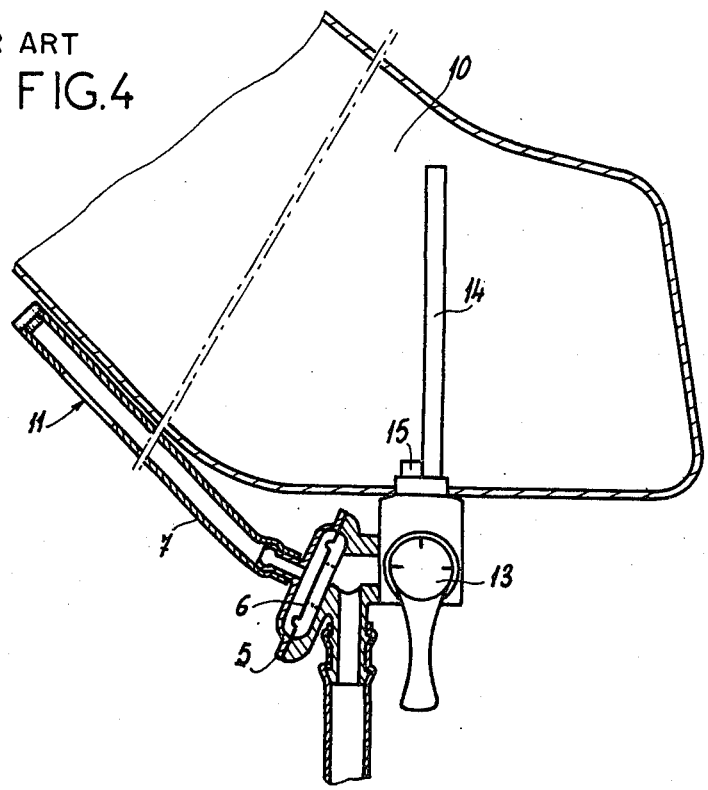
FIG. 4 is a side, cross-sectional view of the device and tank illustrated in FIG. 2, the view being similar to that of FIG. 1.
Figure 5:
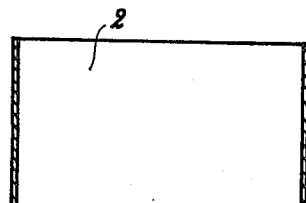
FIG. 5 is a side, cross-sectional view of an exemplary device for displaying the level of fluid contained in a tank according to the present invention, the tank being shown as well.

Before turning to a description of the illustrated embodiment of the present invention illustrated in FIG. 5, a brief discussion of the technical area of concern and the prior art in general and as shown in FIGS. 1-4 is in order.

Figure 1:
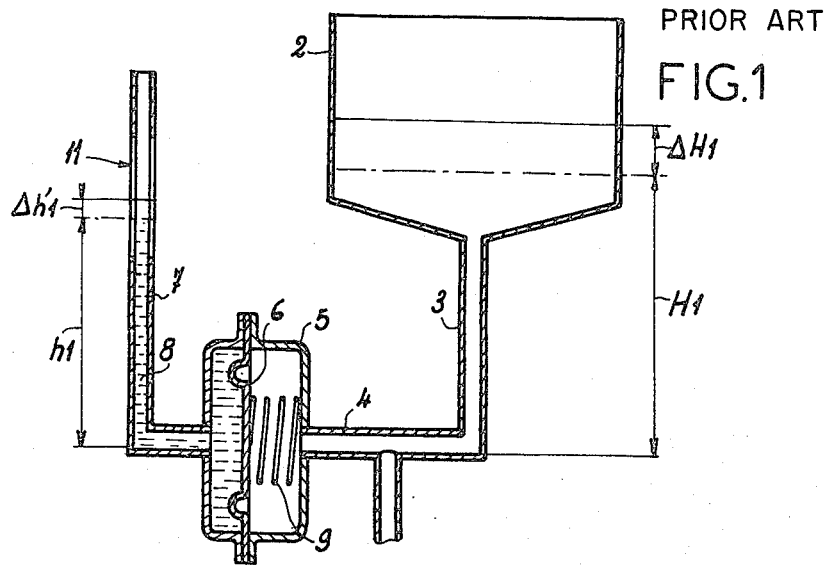
FIG. 1 is a side, cross-sectional view of a prior art device for displaying the level of fluid in a tank of the type using a membrane to separate the fluid in the tank from that in a measuring tube.

As mentioned above, it is known how to provide a device for displaying the level of liquid in a tank using a membrane such as shown in FIGS. 1-4 of the accompanying drawing. This known type of device as shown in FIG. 1 includes fuel tank 2 beneath which is provided a pipe 3 in fluid communication with the tank 2. The pipe 3 is intended to bring fuel to a carburetor of an engine of the vehicle. On the pipe 3 is a tap 4 bringing the fuel to a housing 5 in the central part of which is mounted a membrane 6 preventing passage of the fuel from the tap 4 through the housing 5. On the other side of the membrane 6 is provided, coming out in the housing 5, a pipe 7 containing a liquid 8 of a specific gravity greater than that of the fuel within the tank 2. The volume contained in the pipe 7 is determined and is invariable in time.

Let $\pi$ be the specific gravity of the fuel in the tank 2 and $\pi'$ be that of the display liquid 8, and let H1 be the level of the fuel and h1 be that of the display liquid 8, and finally let S be the surface of the membrane 6, when the membrane 6 has not been deformed and in the absence of a spring or with a spring at rest, the relation:

$\pi H1 S = \pi' h1 S$ prevails

The following calculations were made without the spring intervening.

If liquid is added to the tank 2 bringing the fuel to a height $H1 + \Delta H1$, the membrane 6 will be deformed, exerting a total resistance F to this additional pressure corresponding to a unit resistance $f = F/s$, while the level of the display liquid 8 will come to $\Delta h1$. One has then the relation:

$$\pi(H1 + \alpha H1)S = F + \pi'(h1 + \Delta h1)S, \qquad (Eq.\ 1)$$

or $$\pi(H1 + \Delta H1) = f + \pi'(h1 + \Delta h1), \qquad (Eq.\ 2)$$

Since $$\pi H1 = \pi' h1, \quad \text{(Eq. 3)}$$

one has $$\pi \Delta H1 = f + \pi' \Delta h1, \text{ and} \quad \text{(Eq. 4)}$$

$$\Delta h1 = (\pi/\pi') \Delta H1 - (f/\pi) \quad \text{(Eq. 5)}$$

Term $\Delta h1$ is consequently less than the value that would have been reached without the influence of the membrane 6.

Also, if a height H1 of the fuel in the tank 2 is removed, the membrane 6 will be deformed in the opposite direction, exerting a resistance F to the pressure exerted by the display liquid 8. One then has:

$$\pi(H1 - \Delta H1)S + F = \pi'(h1 - \Delta h1)S, \quad \text{(Eq. 6)}$$

or $$\pi(H1 - \Delta H1) + f = \pi'(h1 - \Delta h1), \quad \text{(Eq. 7)}$$

$$-\pi \Delta H1 + f = -\pi' \Delta h1, \quad \text{(Eq. 8)}$$

$$\pi \Delta H1 - f = \pi' \Delta h1, \text{ and} \quad \text{(Eq. 9)}$$

hence $$\Delta h1 = (\pi/\pi')(H1 - [f/\pi]). \quad \text{(Eq. 10)}$$

If the membrane 6 is very stiff, f very high and the substractive factor is great. Thus there is a reduction factor between the tank 2 which undergoes additions or withdrawals of fuel and the display device. The side that does not undergo additions or withdrawals is reduced in relation to the one that does. The presence of the membrane 6 makes it possible to reduce the amplitude of the display by introduction of a subtractive factor at the level of the movement of the display fluid 8.

Inside the housing 5 is mounted, on the tank side, a coil spring 9 resting, on the one hand, on the membrane 6 and, on the other hand, on the inside face of the housing 5 located on the tank side. A coil spring 9 is provided and is intended to assure holding of the membrane 6 in a substantially planar position, which is advantageous particularly when the pressure exerted by the fuel inside the tank 2 is slight, because this makes it possible to have a maximum sensitivity even under these conditions.

Figure 2:
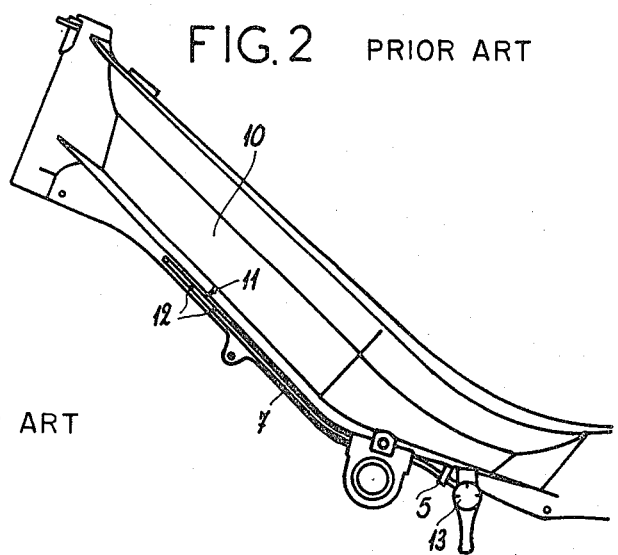
FIG. 2 is a end view of a device for displaying the level of fluid in a tank showing a general case in which the device is operatively associated with a shell tank.

FIGS. 2 and 3 show a general case of mounting of a display device of the type shown in FIG. 1 applied to a shell tank of a MOPED. As shown in FIGS. 2 and 3, a pipe 7 extends along a shell tank 10, being located on the front part by the latter and placed slightly to the side to avoid being caught by a rider during use of the vehicle, as best shown in FIG. 3. A display area 11, which includes graduations 12, corresponding to the various filling level of the tank 10, can be located, as shown in FIG. 2, in a position in which its reading would not be easily effected by the rider.

FIG. 4 shows an embodiment of the device of FIGS. 2 and 3 in which it is associated with a reverse cock. In this case, the pipe bringing the fuel to the membrane is located downstream from a three-way cock 13 allowing gasoline supply to the carburettor, either from a pipe 14 coming out approximately above the bottom of the tank 10, or from a pipe 15 coming out in the immediate vicinity of the bottom of the tank 10.

Since the speed of the fuel is slight in the supply line, the pressure intake which goes to the booster is practically undistrubed in relation to a static measurement. In case of a leak, a case in which the speed of passage creates a depression, the control level drops noticably.

The device of FIG. 4 nevertheless has the drawback that reading the level is not done at a constant height.

This invention provides a device for displaying the level of fluid contained in a tank which makes it possible to remedy the above-mentioned drawbacks.

For this purpose, the device according to the present invention includes on the membrane side, where the display liquid is located, a spring which acts on the membrane to move it in the direction towards the other or tank side, and able to be compressed by a screw engaged in a stationary nut fastened to the housing, an index being provided to mark the relative position of the screw and nut, a reference level being marked on the pipe containing the display liquid.

Measurement of the amount of fuel in the tank is performed by bringing the level of the display liquid to the reference level of the pipe, by modification of the compression of the spring acting on the membrane. This modification of compression corresponds to a modification of the position of the screw in relation to the nut. A calibration of the means for marking the relative positions of the screw and nut makes it possible to know for each position of the screw, the value of the filling of the tank.

Advantageously, the spring tension screw is solid with a holder mounted around the nut fastened to the housing, the marks being made on the holder and nut to determine the relative position of these two elements.

Since the device of the present invention is or may be applied very often to the equipment of a MOPED, the pipe containing the display liquid is desirably fastened along the shell tank on the front of the latter with a slight side effect, in a conventional manner.

The device according to the present invention can be associated with a conventional pet cock or with a so called reserve system, i.e., a system comprising two possibilities of taking fuel at two different levels within the tank.

In any event, the present invention is to be better understood from the following descriptions, with reference to the accompanying diagrammatic drawing showing by way of nonlimiting example an illustrative embodiment of the device.

Figure 6:
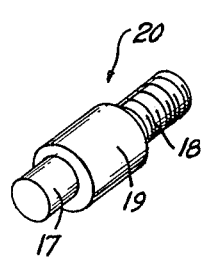
FIG. 6 is a perspective view of a portion of the device of FIG. 5.
Figure 6:
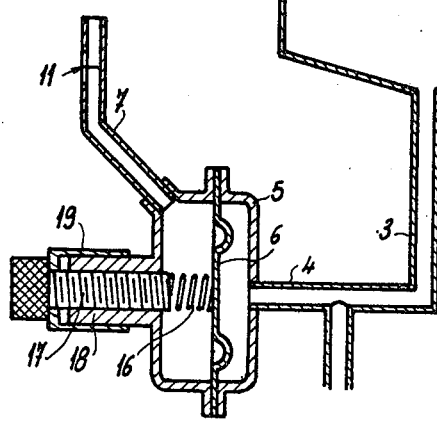

FIGS. 5 and 6 of the accompanying diagrammatic drawings shows an embodiment of a display device according to the present invention.

In FIG. 5, a pipe 7 containing the display liquid exhibits only a single reference mark 11. On the face of a membrane 6 located on the side of the liquid display the level rests a coil spring 16 which can be compressed by a screw 17 which, going through a housing 5 with fluid tightness, is engaged in a fixed nut 18 forming part of the housing 5. The screw 17 carries a holder 19. The nut 18 carries calibrated marks 20 indicating the level of filling of a tank 2 as a function by the spring 16, this latter being such that the level of the display liquid in the pipe 7 is at the reference mark 11 on the pipe 7. The pipe 7 is transparent or translucent in the vicinity of the mark 11.

It is to be understood the foregoing description and accompanying drawings, particular FIG. 5, relates to a preferred embodiment of the present invention given by way of example, not by way of limitation. It is to be

What is claimed is:

1. In a device for displaying level of a fluid of a tank, the device including a housing, a single membrane positioned within the housing to separate said housing into a first chamber and a second chamber, communicating means for providing fluid communication between the tank and the first chamber of the housing, a pipe at least a portion of which is transparent or translucent, in fluid communication with said second chamber of the housing and a display liquid of given substantially fixed volume within said pipe, said fluid of said tank and said display liquid both being bounded in part by said single membrane, the improvement comprising means to determine the level of fluid in the tank by adjusting the position of said membrane and thereby bringing the level of the display liquid to a given position in said pipe, said means comprising spring means within said second chamber of said housing in contact with said membrane on that side thereof which is in contact with said display liquid, a nut fixed to said housing on the second chamber side thereof, a screw extending through said nut into said second chamber of said housing and in contact with said spring means to adjustably compress said spring means to adjust the position of said membrane and to thereby bring the level of the display liquid to the given position, and index means on said nut for determining instant relative position of said screw with respect to said nut to provide a reading of the level of fluid in the tank.

2. An improved device according to claim 1, including at least one reference mark on said pipe on a transparent or translucent portion thereof.

3. An improved device according to claim 1 or claim 2, including a holder integral with said screw and positioned about said nut, and wherein said index means comprise marks on said nut to determine the instant position of said screw with respect to said nut.

4. An improved device according to claim 1 or claim 2, in operative association with a motorized cycle, said pipe containing said display liquid being positioned on said tank in front and slightly offset to a side, said tank being a shell tank.

5. An improved device according to claim 1 or claim 2, including a cock positioned between said tank and said housing.

6. An improved device according to claim 1 or claim 2, including a reserve cock operatively arranged to draw fuel from two different levels within said tank.

* * * * *